United States Patent
Carlson et al.

(10) Patent No.: US 7,228,202 B2
(45) Date of Patent: Jun. 5, 2007

(54) INDUSTRIAL ROBOT

(75) Inventors: Erik Carlson, Nesuddtangen (NO); Svein Johannesson, Oslo (NO); Jan Endresen, Asker (NO); Ralph Sjöberg, Västerås (SE)

(73) Assignee: ABB AB, Västerås (SE)

( * ) Notice: Subject to any disclaimer, the term of this patent is extended or adjusted under 35 U.S.C. 154(b) by 580 days.

(21) Appl. No.: 10/473,733

(22) PCT Filed: Apr. 2, 2002

(86) PCT No.: PCT/SE02/00646

§ 371 (c)(1), (2), (4) Date: Feb. 27, 2004

(87) PCT Pub. No.: WO02/078915

PCT Pub. Date: Oct. 10, 2002

(65) Prior Publication Data

US 2005/0055130 A1    Mar. 10, 2005

(30) Foreign Application Priority Data

Apr. 2, 2001   (SE) .................................. 0101202

(51) Int. Cl.
 *G06F 19/00*  (2006.01)
(52) U.S. Cl. ................. 700/245; 700/258; 318/568.11; 600/1; 600/130; 606/300; 606/428
(58) Field of Classification Search ................ 700/245, 700/258; 318/568.11; 600/300, 428; 606/1, 606/130
See application file for complete search history.

(56) References Cited

U.S. PATENT DOCUMENTS 5,084,826 A    1/1992  Hariki et al.

FOREIGN PATENT DOCUMENTS

| DE | 29710026 | 9/1997 |
| EP | 1006694  | 6/2000 |
| JP | 9117888  | 5/1997 |
| JP | 1173201  | 3/1999 |

OTHER PUBLICATIONS

E. Lo et al., Indoor Wireless Lan Access Methods for Factories, Communications and Science Laboratory, School of Engineering and Science, Simon Fraser University, pp. 113-118.

*Primary Examiner*—Thomas Black
*Assistant Examiner*—McDieunel Marc
(74) *Attorney, Agent, or Firm*—Venable LLP; Eric J. Franklin

(57) ABSTRACT

A communication system for safe wireless control of an maneuverable object. A control unit includes an operator for operating the object and a receiver for receiving wireless information. A portable operating unit has a transmitter for transmitting wireless information. The information is divided in time slots, each including a data package. The receiver includes a detector for detecting in a time part of a time slot the presence of the data package and a calculator for calculating upon a reception failure the number of time parts having no presence of the data package following a time slot with presence of the data package. The control unit exercises a control command when a data package with a correct information has been received within a number of time parts just exceeding a full time slot.

27 Claims, 1 Drawing Sheet

INDUSTRIAL ROBOT

CROSS-REFERENCE TO RELATED APPLICATIONS

This application claims priority to Swedish patent application 0101202-0 filed 2 Apr. 2001 and is the national phase under 35 U.S.C. § 371 of PCT/SE02/00646 filed 2 Apr. 2002.

TECHNICAL FIELD

The present invention relates to a communication system for safe wireless control of a maneuverable object. Such a communication system comprises a control unit with operating means for controlling the object and receiving means for wireless information. It also comprises a portable operating unit with sending means for wireless information. The information is transmitted in time slots, each containing a data package.

The present invention also relates to an industrial robot comprising a manipulator with a plurality of moveable members, a control unit with means for automatically operating the manipulator and receiving means for wireless information. Further the robot comprises a portable operating unit with sending means for wireless information, where said information is divided in time slots, each containing a data package.

Further the present invention comprises a method for safe wireless control of an industrial robot. The method comprises an operation unit sending in time slots information to the control unit, where said information is divided in time slots, each containing a data package.

BACKGROUND OF THE INVENTION

In order to accomplish a safe control of a moveable object such as an industrial robot it is essential to have absolute confidence in the control of the object. As an object in this context should be understood any stationary or mobile moveable object. The operator must be fully confident that the commanded order is effected. Any other person or machine must not be able to interfere with the control of the object on purpose or by accident.

In a system where an operating unit is connected to a control unit via a cable this is easy. Such a cable is preferably shielded and no other communication system can interfere with the two connected units. The cable is however heavy and stiff thus making the operation of the operating unit cumbersome. Another problem with a cable connection is that the cable often is getting entangled in loops thus making it difficult to stretch it out. When a plurality of robots are placed together in a cell the cables often are entangled themselves thus making it difficult to find out which operating unit belongs to which robot. Finally there is the risk of the cable being damaged especially when a vehicle is running over it. If the cable is damaged it is involving much work to have it repaired or exchanged. It is therefore a long lasting desire in the industry of industrial robots to carry out robot control without a cable.

The obvious solution is a wireless control system. The need described above then will be very obviously solved. Controlling an object with a wireless system where the air could contain a plurality of simultaneous command messages involves, however, other problems. The receiving part of a specific control system must find out and recognize a control message addressed to that specific control unit and effectuate that command. It is in such an environment obvious that sometimes different signals will interfere with each other. It is also obvious as the operating unit is moved around that sometimes the aerial will be located in a "radio shadow" thus no signal from the unit will be received by the control unit. In such cases there must be a control system which accounts for time slots where no signal is received and for a correct action accordingly.

From "Gebrauchsmuster" DE 297 10 026 U1 a wireless control of an industrial robot is previously known. A mobile operating unit has a wheel knob that sends pulses via a Digital European Cordless Telephone (DECT) module to a numeric control device. The safety aspects of this wireless control is not mentioned in the document. There is thus nothing mentioned on how to proceed when a signal is not received by the receiving part.

Another wireless control system is previously known from JP 11073201. The problem solved in this document is the communication of an emergency stop control carried out by wireless means in a manner equivalent to a cable communication. Under normal conditions the controller periodically transmits data to the operating unit. Upon receiving this data the operating unit responds by transmitting a response signal back to the controller. Thus the control unit asks the operating unit if this is in function. The reason for making the communication intermittent is that data, if transmitted and received at every time, increases the electric power consumption of the battery-operated teaching unit. The length of a time period however is not mentioned. The controller judges from said response signal that the operating unit is in normal condition. If the emergency switch has been activated the response signal carries that information and the controller executes the emergency stop.

Under abnormal situations, that means when the operating unit is not in a correct function mood, the operating unit transmits no response signal. Based on the absence of a response from the operating unit the controller outputs the conclusion that there is an "emergency stop condition".

From JP 9117888 another control system is known the object of which is to provide a remote control with an emergency stop function. The system is said to ensure safety while cutting costs by making possible to carry out the remote control of a robot etc by transmitters for wireless remote controllers or by serial wired communication means. According to the system an operator is actuating a control permit switch by means of a key operation. A base signal is then continuously transmitted from the transmitter of the operating unit. When driving control switches are activated a driving control signal is transmitted in addition to the base signal.

A control part of the system is provided in the object to be controlled. When a continuous base signal is received and driving control signals are received in addition to this the driving means is then controlled. When, however, the base signal is interrupted the driving is stopped irrespective of the existence of other signals. Thus an emergency stop function is achieved by reliably stopping the driving means when the actuation of said control permit switch is released.

The signal is sent in time slots, which has a typical length of 108 ms, and contain a leader code (A), a control permit code (C) also known as base signal and a switch code (B). In the absence of the base signal the power source of the driving control means is cut of and the motor is stopped irrespective of the other signals. Thus when the need for an emergency stop arises the motor is reliably stopped when the operator stops operating the key of the servo control permit switch. Also when the signal between the transmitter and the robot is cut off or when the transmission is poor the power source is cut of from the driving control means thus effecting an emergency stop function.

Both of these Japanese documents describe the execution of an emergency stop in the absence of a base signal sent from an operating device. However, an emergency stop is not wanted when a signal from the operating unit is just lacking for a short moment. There will always be moments when such a base signal is not received for one or more time slots. This, however, does not call for an emergency stop execution.

When an emergency stop is executed the whole robot cell or even several cells will be cut of from electric power. To reset an emergency stop a plurality of checks has to be made and the cell will be out of work for a considerable time. This is therefore a not wanted situation.

SUMMARY OF THE INVENTION

A primary object of the present invention is to devise ways to find a solution to a safe wireless control of a moveable object. Such a control system shall control the object even under conditions when communication is poor and when a data signal is missing for short periods of time. The control system shall also execute an emergency stop on command or when the wireless communication is broken. These objects are achieved according to the invention in a first aspect with a communication system, in a second aspect according to an industrial robot, and in a third aspect according to a method These objects are achieved according to the invention in a first aspect with a communication system according to the features in the characterizing part of the independent claim 1, in a second aspect according to an industrial robot according to the characterizing features of the independent claim 13, and in a third aspect according to a method according to the characterizing features of the independent claim 21. Preferred embodiments are described in the dependent claims.

According to the first aspect of the invention a communication system for safe wireless control of a maneuverable object is disclosed where a receiving means comprises detecting means for detecting in a time part of a time slot the presence of a data package and calculating means for calculating upon a reception failure the number of time parts having no presence of said data package following a time slot with presence of said data package whereupon the control unit exercises a control command when a data package has been received within a number of time parts just exceeding a full time slot.

The principle of a wireless safety loop is based on transmitting a continues stream of data packages, each within a time slot of a specified maximum gap, from the operating unit to the control unit. This stream of data packages will be sent even when the operating unit does not actively control the robot. On the controller side a watchdog device with a specified timeout is implemented. The control unit thus comprises an electronic hardware means with a processor, which in the absence of a software product running the processor will execute a safety stop of the object. The watchdog device looks for the necessary software pieces in the data packages received from the operating unit. If there is no such software piece in the data package or there is no data package at all the watchdog executes a safety stop. If during the following time slots there is no software piece or no data packages for a predefined time interval the watchdog executes an emergency stop. A typical time slot would be 100 ms.

In a wireless link there is no guarantee for a continues connection. There will be short breaks caused by multipath fading etc. There could also be longer breaks caused by radio path obstructions and such. Finally there could be long-lasting breaks caused by battery failure. There are thus three different time windows that calls for different action by the watchdog. For short breaks, that is in the area of 1.5 time slots the control of the object should not be affected. The optimum watch-time for the watchdog when there is no time mismatch would be a time slot plus the length of a data package. For longer breaks, that is, up to about 500 ms the watchdog should execute a safety stop. That means that when the watchdog detects a new data package within that time the control of the object should continue. But when the break last for longer than 500 ms an emergency stop should be executed.

In a further embodiment of this aspect of the invention the sending means and the receiving means are parts of a wireless local area network. In yet another embodiment, this local area network is a Bluetooth network.

In a further embodiment of the invention the data package contains an address part, an instruction part, a data part and an identifying part. In one embodiment the data is encrypted. The data part is carrying data for controlling the object. The data is also carrying enabling information, emergency stop execution and software pieces for the watchdog means. Preferably the data comprises operating commands that contain movement instructions that allow the object to move for at least one time slot in advance. Preferably it will last for one and a half time slot. If thus these operating commands arrive in each time slot, the commands are overlapping each other thus giving the object a smooth movement. The overlapping will also ensure a smooth operation if there is a clock mismatch between the operating unit and the control unit.

In one embodiment, the command contains a movement allowance for just over two time slots. This will assure a smooth operation if there is a missing data package in one time slot only. On such reception failure in just one time slot the next command will still overlap the command under execution, thus giving the object a smooth movement.

According to the second aspect of the invention an industrial robot is disclosed where a receiving means comprises detecting means for detecting in a time part of a time slot the presence of said data package and calculating means for calculating the number of time parts having no presence of said data package following a time slot with presence of said data package, whereupon the control unit on presence of an enabling signal in the data package exercises a control command when a data package has been received within a number of time parts just exceeding a full time slot.

In a further embodiment of the invention, the control unit further comprises means for putting the manipulator in a safety stop condition after a reception failure during a number of time parts exceeding a full time slot. An emergency stop will be exercised after a reception failure during a predetermined number of time parts.

In a further embodiment of this aspect of the invention, the portable operating unit comprises display means, jogging means, and an emergency stop unit. Yet in another embodiment the data package contains control command which enables the manipulator to move for a predefined time exceeding one time slot.

According to the third aspect of the invention, a method is disclosed which involves the steps of:
dividing each time slot into time parts,
determining the presence of a data package received by the control unit within each of said time part,
calculating upon reception failure the number of time parts with no presence of said data package following a time slot with presence of said data package, and
exercising the control of the manipulator upon reception of said data package within a number of time parts exceeding a full time slot.

In a further embodiment of this aspect of the invention the exercising step of the method further comprises putting the robot in a safety stop condition upon reception failure during a time period corresponding to a number of time parts exceeding a full time slot. An emergency stop is exercised upon reception failure during a time period corresponding to a predefined number of time parts exceeding a full time slot.

BRIEF DESCRIPTION OF THE DRAWINGS

Other features and advantages of the present invention will become more apparent to a person skilled in the art from the following detailed description in conjunction with the appended drawings in which.

DETAILED DESCRIPTION OF THE INVENTION

Figure 1:
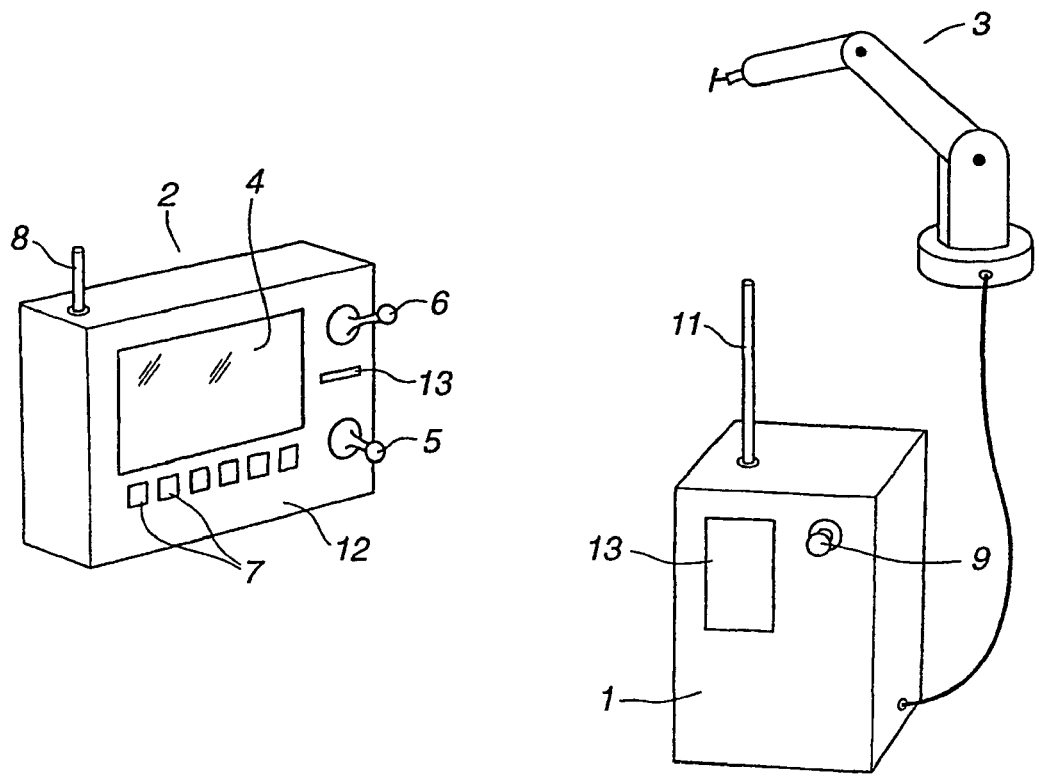
FIG. 1 is a wireless communication system according to the invention.

The wireless system shown in FIG. 1 comprises a control unit 1, a moveable object 3, which in this embodiment is a manipulator and an operating unit 2. The control unit comprises a operators panel 10 for ease of an operator and an emergency stop switch 9 for executing an emergency stop. The control unit also comprises an antenna 11 for communication with the operating unit. A watchdog for executing a safety stop condition upon communication failure is also incorporated in the control unit. The operating unit comprises a portable box 12 containing a display means 4, function keys 7, a joystick 6, an emergency stop device 5 carrying an emergency stop button and an antenna 8 for communication with the control unit 1. The display means is used for all sorts of information preferably communicated from the control unit. The display means may comprise a touch screen by which information can be introduced to the control unit. The joystick is used to execute movement command to the manipulator and the function keys are used to alter the function of the joystick.

The operating unit may also comprise a slot 13 for receiving an identity means for identification of the specific robot to control. The identity means may comprise a key device with a physical pattern to identify the correct robot. It may also comprise an electronic hardware in a slideable form such as a card. Preferably the electronic identity device comprises a processor which by running a computer program executes the identity of the robot to be controlled. In a further embodiment the identity is carried by the emergency stop.

Figure 2:
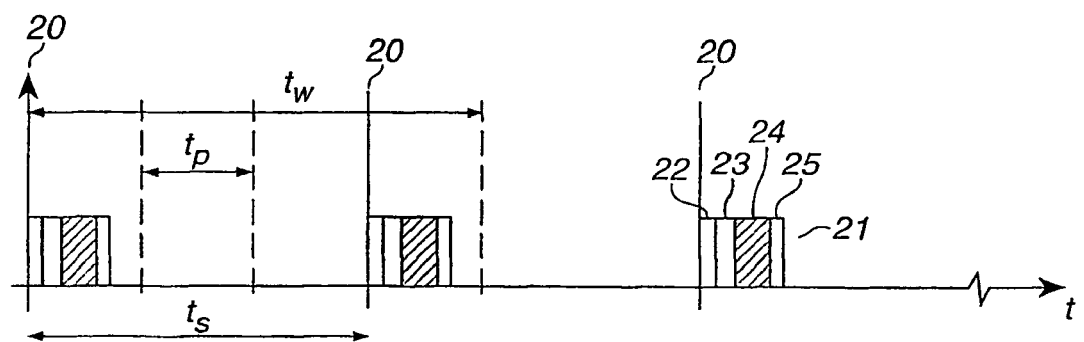
FIG. 2 is plurality of data packages.

In FIG. 2 a typical piece of signal from the operating unit to the control unit is shown. The signal is divided in time slots $t_s$ by the delimiters 20. According to the figure there are three time slots, each containing a data package 21. Each data package contains complete information to control the robot as well as a software piece to feed the watchdog. The length of a time slot is typically 100 ms. Length in this context is in the time domain and measured in seconds or fractions thereof. Preferably the length of a data package is a fraction of a time slot. Each data package comprises an address part 22, a function part, a data part 23 and an identifying part 24. The data part is carrying an operation command.

In order to obtain an overlook of the information the presence of a data package within a time slot is being watched. In a first sense it is of great value that the robot can move continuously and not being interrupted. To accomplish this the operation instruction allows the robot to move for a predetermined piece of time. Preferably this time piece is a bit longer than a time slot. This means that when the next operation command arrives the robot is already moving and the new operation command will take over the ongoing movement and give the robot permission to move another predetermined piece of time.

Due to interference, poor communication and such there will be time slots where a data package will not appear in the receiving unit of the controller. It will be much more common that a data package will be absent in one time slot only than over a plurality of time slots. Losing contact with the operating unit for one time slot only is not a safety hazard and therefore an object of the invention is to overcome short black outs. Hence the presence of data packages in the information signal is watched in time intervals longer than one time slot. Such time interval is preferably longer than one time slot plus the length of one data package. This time length is called watch time $t_w$. To accomplish this the time slot are divided into time parts $t_p$. The watch time is then the length of adjacent time parts just longer than a time slot.

When combining the effect of letting the robot move for a predetermined piece of time which may be as long as the watch time the missing of a data package in one time slot but present in the next the watchdog will cause the robot to move continuously. If however a data package is missing in two adjacent time slots the watchdog in the control unit will put the robot in a safety stop condition. It is of course within the invention to have the watch time defined to any number of time slots with or without the addition of the length of a data package.

Time slots with absence of data package following a time slot with presence of a data package will be counted. If the communication is down for a longer time due to failure such as low battery, the watchdog in the control unit will exercise an emergency stop after counting a predetermined number of time slots without a data package.

The invention claimed is:

1. A communication system for safe wireless control of a maneuverable object, comprising:
a portable operating unit comprising sending means for wireless information, where said information is divided in time slots, each containing a data package; and
a control unit comprising means for operating the object and receiving means for receiving wireless information, wherein the receiving means comprises detecting means for detecting in a time part of a time slot the presence of said data package and calculating means for calculating upon a reception failure the number of time parts having no presence of said data package following a time slot with presence of said data package whereupon the control unit exercises a control command when a data package with correct information has been received within a watch-time comprising a number of time parts just exceeding a full time slot.

2. The communication system according to claim 1, wherein the control unit further comprises means for putting the object in a safety stop condition after a reception failure during a first predetermined number of time parts.

3. The communication system according to claim 2, wherein the first predetermined number of time parts exceeds a full time slot.

4. The communication system according to claim 2, wherein the first predetermined number of time parts exceeds two full time slots.

5. The communication system according to claim 1, wherein the control unit further comprises means for exercising an emergency stop after a reception failure during a second predetermined number of time parts.

6. The communication system according to claim 1, wherein the time part is equal to half a time slot.

7. The communication system according to claim 1, wherein the sending means and the receiving means are parts of a wireless local area network.

8. The communication system according to claim 7, wherein the wireless local area network is a Bluetooth network.

9. A communication system according to claim 1, wherein the data package comprises an address part, an instruction part, a data part and an identifying part.

10. The communication system according to claim 9, wherein the data part is encrypted.

11. The communication system according to claim 9, wherein the data part upon operating failure contains an error detection code.

12. The communication system according to claim 9, wherein the data part comprises an operating command that enables the object to move during more than one time slot.

13. The communication system according to claim 9, wherein the data part comprises an operating command that enables the object to move during more than two time slots.

14. An industrial robot, comprising:
a manipulator comprising a plurality of moveable members;
a control unit comprising means for automatically operating the manipulator and receiving means for wireless information; and
a portable operating unit comprising sending means for wireless information, wherein said information is divided into time slots, each comprising a data package, wherein the receiving means comprises detecting means for detecting in a time part of a time slot the presence of said data package and calculating means for calculating the number of time parts having no presence of said data package following a time slot with presence of said data package, whereupon the control unit on presence of an enabling signal in the data package exercises a control command when a data package has been received within watch-time comprising a number of time parts just exceeding a full time slot.

15. The industrial robot according to claim 14, wherein the control unit further comprises means for putting the manipulator in a safety stop condition after a reception failure during a number of time parts exceeding a full time slot.

16. The industrial robot according to claim 14, wherein the control unit further comprises means for exercising an emergency stop after a reception failure during a predetermined number of time parts.

17. The industrial robot according to claim 14, wherein the portable operating unit comprises display means, jogging means, and an emergency stop unit.

18. The industrial robot according to claim 14, wherein the time part is equal to half a time slot.

19. The industrial robot according to claim 14, wherein the data package contains an address part an instruction part, a data part and an identifying part.

20. The industrial robot according to claim 14, wherein the data package contains control command which enables the manipulator to move for a predefined time exceeding one time slot.

21. The industrial robot according to claim 14, wherein the data part is encrypted.

22. An industrial robot according to claim 14, wherein the data upon operating failure contains an error detection code.

23. A method for safe wireless control of an industrial robot comprising a manipulator, a control unit having means for automatically operating the manipulator and a portable operating unit, comprising the operation unit sending information to the control unit, wherein said information is divided in time slots, each containing a data package, the method comprising:
dividing each time slot into time parts,
determining the presence of a data package received by the control unit within each of said time part,
calculating upon reception failure the number of time parts with no presence of said data package following a time slot with presence of said data package, and
exercising the control of the manipulator upon reception of said data package within a watch-time comprising a number of time parts exceeding a full time slot.

24. The method according to claim 23, wherein exercising the control of the manipulator further comprises putting the robot in a safety stop condition upon a reception failure during a time period corresponding to a number of time parts exceeding a full time slot.

25. The method according to claim 23, wherein exercising the control of the manipulator further comprises exercising an emergency stop command upon reception failure during a time period corresponding to a predefined number of time parts exceeding a full time slot.

26. The method according to any of claims 23, wherein the time part is equal to half a time slot.

27. The method according to any of claims 23, wherein the data package is brought to contain information on addressee, enabling, position of emergency switch, and movement instructions.

* * * * *